(12) United States Patent
Iwamura et al.

(10) Patent No.: US 9,962,994 B2
(45) Date of Patent: May 8, 2018

(54) AIRLESS TIRE AND METHOD FOR MANUFACTURING SAME

(71) Applicant: Sumitomo Rubber Industries, Ltd., Kobe-shi (JP)

(72) Inventors: Wako Iwamura, Kobe (JP); Makoto Sugiya, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days. days.

(21) Appl. No.: 14/889,338

(22) PCT Filed: May 13, 2014

(86) PCT No.: PCT/JP2014/062733
§ 371 (c)(1),
(2) Date: Nov. 5, 2015

(87) PCT Pub. No.: WO2014/188912
PCT Pub. Date: Nov. 27, 2014

(65) Prior Publication Data
US 2016/0089935 A1    Mar. 31, 2016

(30) Foreign Application Priority Data

May 22, 2013   (JP) .................................. 2013-108280
May 22, 2013   (JP) .................................. 2013-108281

(51) Int. Cl.
*B60C 7/14*      (2006.01)
*B29D 30/02*    (2006.01)
(Continued)

(52) U.S. Cl.
CPC ................ *B60C 7/14* (2013.01); *B29D 30/02* (2013.01); *B29D 99/0032* (2013.01); *B60C 7/18* (2013.01);
(Continued)

(58) Field of Classification Search
CPC ........ B60C 2007/107; B60C 2007/146; B60C 7/14; B60C 7/143; B60C 7/18;
(Continued)

(56) References Cited

U.S. PATENT DOCUMENTS 1,885,545 A    11/1932   Rangel
4,832,098 A     5/1989   Palinkas et al.
(Continued)

FOREIGN PATENT DOCUMENTS

GB          978913 A  *  1/1965   ............... B60B 9/08
JP      58-101803 A      6/1983
(Continued)

OTHER PUBLICATIONS

International Search Report dated Jul. 29, 2014 in PCT/JP14/062733 Filed May 13, 2014.
(Continued)

*Primary Examiner* — Kip T Kotter
*Assistant Examiner* — Scott A Browne
(74) *Attorney, Agent, or Firm* — Oblon, McClelland, Maier & Neustadt, L.L.P.

(57) ABSTRACT

The present invention increases the bonding strength between a spoke and a tread ring and/or between a spoke and a hub to improve durability. An airless tire provided with a tread ring, a hub, and a spoke, wherein the spoke is integrally provided with: an outer annular portion of which the outer peripheral surface is bonded to the inner peripheral surface of the tread ring via a first adhesion layer; an inner annular portion of which the inner peripheral surface is bonded to the outer peripheral surface of the hub via a second adhesion layer, and a spoke portion which couples the inner and outer annular portions. The inner peripheral surface of the tread ring and/or the outer peripheral surface of the hub is composed of a roughened surface having a surface roughness (Continued)

(Ra) (arithmetic average roughness) of 3-1000 µm or a surface roughness (Rz) (ten-point average roughness) of 30-5000 µm.

20 Claims, 8 Drawing Sheets

(51) Int. Cl.
*B60C 7/18* (2006.01)
*B29D 99/00* (2010.01)
*B60C 7/12* (2006.01)
*B60C 7/00* (2006.01)

(52) U.S. Cl.
CPC .......... *B60C 7/12* (2013.01); *B60C 2007/005* (2013.01); *B60C 2007/146* (2013.01)

(58) Field of Classification Search
CPC ....... B60B 1/0246; B60B 1/0261; B60B 9/26; B29D 99/0032; B29D 30/02
See application file for complete search history.

(56) References Cited

U.S. PATENT DOCUMENTS

| | | | | |
|---|---|---|---|---|
| 4,934,425 | A * | 6/1990 | Gajewski | B60C 7/12 152/323 |
| 5,023,040 | A | 6/1991 | Gajewski et al. | |
| 8,528,991 | B2 * | 9/2013 | Schlanger | B60B 1/003 301/55 |
| 9,290,053 | B2 * | 3/2016 | Choi | B60C 7/18 |
| 9,573,422 | B2 * | 2/2017 | Gass | B60B 9/00 |
| 2006/0145528 | A1 * | 7/2006 | Dangleman | B60B 7/004 301/37.101 |
| 2011/0024008 | A1 | 2/2011 | Manesh et al. | |
| 2013/0139938 | A1 | 6/2013 | Kouno et al. | |
| 2013/0206301 | A1 * | 8/2013 | Fudemoto | B60C 9/22 152/450 |
| 2013/0240272 | A1 * | 9/2013 | Gass | B60B 9/00 180/54.1 |

FOREIGN PATENT DOCUMENTS

| | | | | |
|---|---|---|---|---|
| JP | 63-154301 | U | 10/1988 | |
| JP | S63154301 | * | 10/1988 | .............. B60B 9/08 |
| JP | 1-285403 | A | 11/1989 | |
| JP | 2005-161959 | A | 6/2005 | |
| JP | 2005161959 | A * | 6/2005 | .............. B60B 9/08 |
| JP | 2007-62517 | A | 3/2007 | |
| JP | 2008-260514 | A | 10/2008 | |
| JP | 2009149146 | A * | 7/2009 | .............. B60C 7/14 |
| JP | 2011-219009 | A | 11/2011 | |
| WO | 2012/018020 | A1 | 2/2012 | |

OTHER PUBLICATIONS

Extended European Search Report dated Jan. 25, 2017 in Patent Application No. 14800903.8.
Henning Gleich, "Zusammenhang Zwischen Oberflächenenergie und Adhäsionsvermögen von Polymerwerkstoffen am Beispiel von PP und PBT und deren Beeinflussung durch die Niederdruck-Plasmatechnologie" Internet: http://duepublico.uni-duisburg-essen.de/servlets/DerivateServlet/Derivate-5593/gleichdiss.pdf, XP055333115, Apr. 14, 2004, pp. 1-103 with cover pages.

* cited by examiner

AIRLESS TIRE AND METHOD FOR MANUFACTURING SAME

TECHNICAL FIELD

The present invention relates to an airless tire and a method for manufacturing the same having an improved bonding strength between a spoke and a tread ring and/or between the spoke and a hub to improve durability.

TECHNOLOGY BACKGROUND

As a conventional airless tire, a solid tire having a solid rubber structure is mainly used for an industrial vehicle. The tire having solid rubber structure is however large in mass and inferior in shock absorption. Therefore, the tire has not been adopted for a riding comfortability-critical passenger vehicle.

To improve the riding comfortability of such an airless tire in order to apply for also the passenger vehicle, a structure (hereinafter may be referred as a "spoke structure") to connect the tread ring and the hub by the spoke arrayed in the radial fashion (see Patent Document 1, for example).

And the Patent Document 1 proposes a bonding adhesively between the tread ring and the spoke and between the spoke and the hub. In this instance, it is possible to sufficiently ensure the bonding strength through a proper selection of the adhesive agent, and it is possible to exert necessary drag to load (up-and-download, back-and-forth force, lateral force and the like) in use as a tire.

However, when the airless tire mounted on an actual vehicle to run numerously, there are phenomenons such that sand and stone and the like on a road hit the tire and that the tire contacts with a curbstone when parking. This hit and contact do not have special trouble as far as they hit the spoke it self, the tread ring itself or the hub itself. However, they infrequently hit a bonding portion between the spoke and the tread ring and/or the bonding portion between the spoke and the hub, thereby damaging an outer end portion of an adhesion layer. Once this damage generates, the sand and grave stone and the like go into an interspace of the damaged portion, and the damage gets worse gradually. Then, it provokes flaking between the spoke and the tread ring and/or the spoke and the hub; therefore it deteriorates the durability of the tire.

To prevent this flaking, it is necessary to more improve at least the bonding strength itself between the spoke and the tread ring and/or the bonding strength itself between the spoke and the hub to inhibit the growth of damage.

THE PRIOR ART DOCUMENT

Patent Document

Patent document 1: Japanese laid-open patent Publication No. 2008-260514

SUMMARY OF THE INVENTION

Problems to be Solved by the Invention

The present inventions intend to provide an airless tire and a method for manufacturing the same having an improved bonding strength between a spoke and a tread ring and/or between a spoke and a hub to improve durability.

Means for Solving the Problem

The first invention of the present application is an airless tire comprising a cylindrical tread ring comprising a contact area, a hub disposed inwardly in the radial direction of the tread ring and fixed to an axle, and a spoke connecting the tread ring and the hub. The spoke is formed of a cast molding body made of high-polymer material and comprises integrally an outer annular portion of which outer peripheral surface is bonded on an inner peripheral surface of the tread ring via a first adhesion layer made of adhesive agent, an inner annular portion of which inner peripheral surface is bonded on the outer peripheral surface of the hub via a second adhesion layer made of adhesive agent, and a spoke portion connecting the outer annular portion and the inner annular portion. The inner peripheral surface of the tread ring and/or the outer peripheral surface of the hub is formed as a roughened surface having a surface roughness Ra (arithmetic roughness) ranging from 3 to 1000 μm or a surface roughness Rz (ten-point average roughness) ranging from 30 to 5000 μm.

The second invention of the present application is a method for manufacturing the airless tire according to the first invention. The method for manufacturing comprises a first coating process of applying the adhesive agent on the inner peripheral surface of the tread ring to form a first adhesion layer, a second coating process of applying the adhesive agent on the outer peripheral surface of the hub to form a second adhesion layer, and a molding process. The molding process comprising a step of setting the tread ring and the hub with the adhesive agent in a casting mold to form space corresponding to the spoke between the tread ring and the hub, and a step of filling raw material fluid of the high-polymer material into the space to form the spoke integrally with the tread ring and the hub. Before the first coating process and/or the second coating process, a surface roughening process of roughening the inner peripheral surface of the tread ring and/or the outer peripheral surface of the hub is performed so that the inner peripheral surface and/or the outer peripheral surface has the surface roughness Ra (arithmetic roughness) ranging from 3 to 1000 μm or the surface roughness Rz (ten-point average roughness) ranging from 30 to 5000 μm.

The above-mentioned "surface roughness Ra (arithmetic roughness)" means the value based on JIS B0601, Article 4.21; and the "surface roughness Rz (ten-point average roughness)" means the value based on JIS B0601, Appendix JA. 1.

The Effect of the Present Invention

As mentioned above, in the present inventions, an airless tire has a bonding between a tread ring and a spoke via a first adhesion layer and a bonding between the spoke and a hub via a second adhesion layer. An inner peripheral surface of the tread ring to be applied with the first adhesion layer and/or an outer peripheral surface of the hub to be applied with the second adhesion layer is formed as a roughened surface having the surface roughness Ra (arithmetic roughness) ranging from 3 to 1000 μm or the surface roughness Rz (ten-point average roughness) ranging from 30 to 5000 μm.

In this manner, since the inner peripheral surface of the tread ring and/or the outer peripheral surface of the hub are roughened surfaces, a contact area with adhesive agent can be improved. And the adhesive agent gets through the asperity of the roughened surface and intertangles, thereby improving the bonding strength. As a result, also when the hits of the sand and stone in running and contact with the curbstone cause damage at the outer end of the adhesion layer, the growth of the damage can be inhibited, and the flaking between the spoke and the tread ring and/or between the spoke and the hub can be inhibited, thereby improving the durability of the tire.

When the surface roughness Ra or Rz falls below the above-mentioned ranges, the enhancing effects of the bonding strength is insufficient, and the durability of the tire cannot be sufficiently improved. In case that the inner peripheral surface of the tread ring is the roughened surface, when the surface roughness Ra or Rz exceeds the above-mentioned ranges, rubber of a salient on the roughened surface is mixed into the outer peripheral surface side of the outer annular portion of the spoke, and the strength of the outer peripheral surface of the outer annular portion decreases; therefore it possibly causes the deterioration of the durability of the tire. When the outer peripheral surface of the hub is the roughened surface, the surface roughness Ra or Rz exceeds the above-mentioned ranges, the strength of the hub itself decreases, and it possible provokes a damage to the hub itself during use.

A BRIEF DESCRIPTION OF THE DRAWINGS

FIGS. 4 (A) to (D) are conceptual developed views in the flat of an arraying state of a spoke board, where the spoke portion comprises spoke board row.

FIGS. 5 (A) to (D) are conceptual developed views in the flat of a state of the spoke board, where the spoke portion comprises spoke board row extending continuously in the circumferential direction.

Figure 6A:
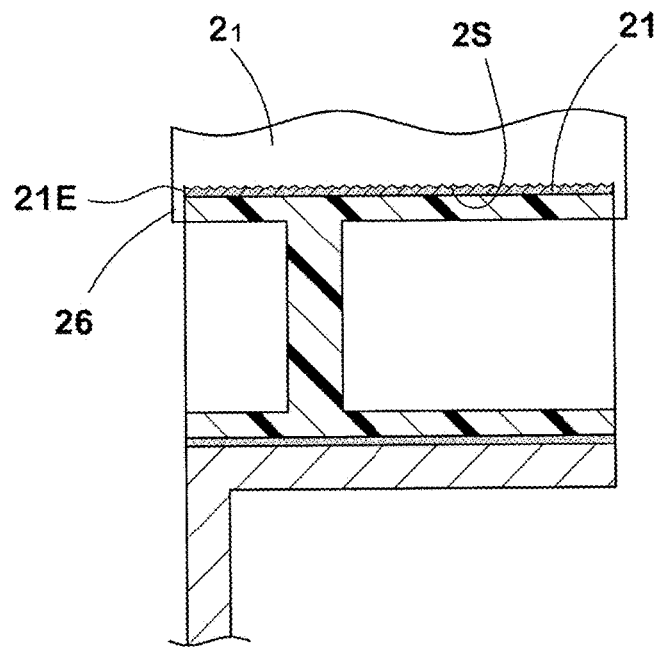
Figure 6B:
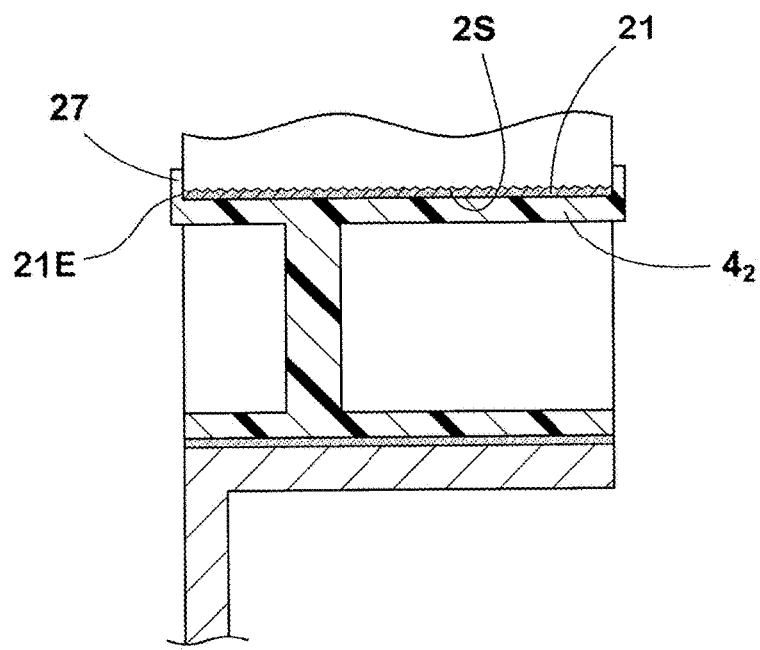

FIGS. 6 (A) and (B) are partial cross-section views showing another embodiment of the first covering member.

Figure 7A:
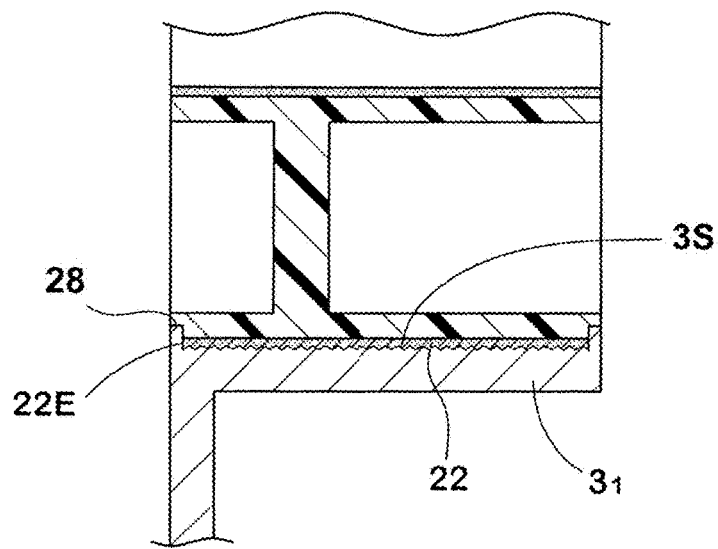
Figure 7B:
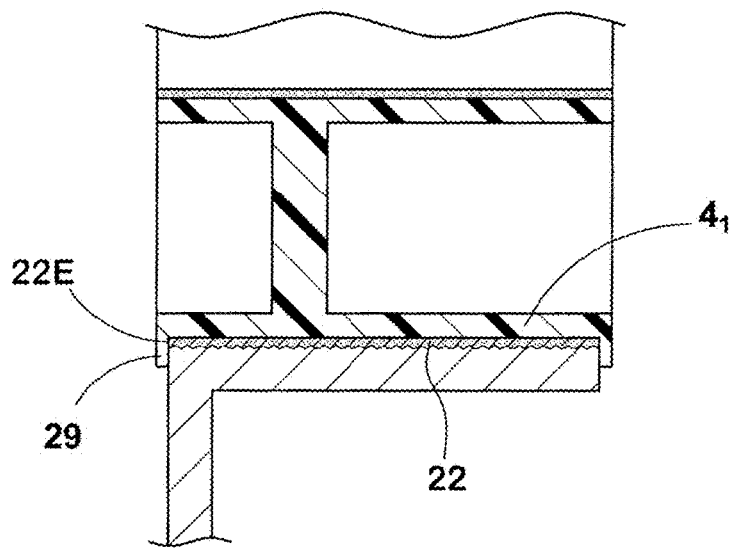

FIGS. 7 (A) and (B) are partial cross-section views showing another embodiment of the second covering member.

Figure 8A:
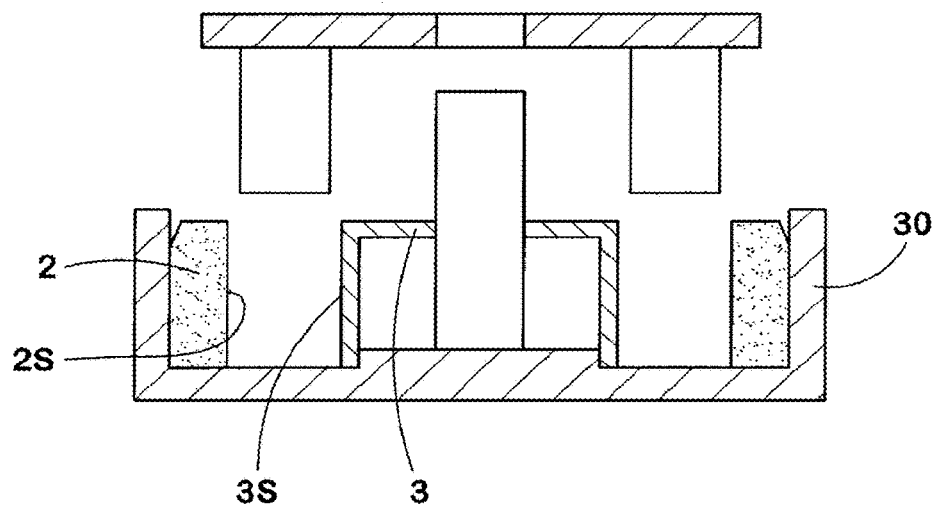
Figure 8B:
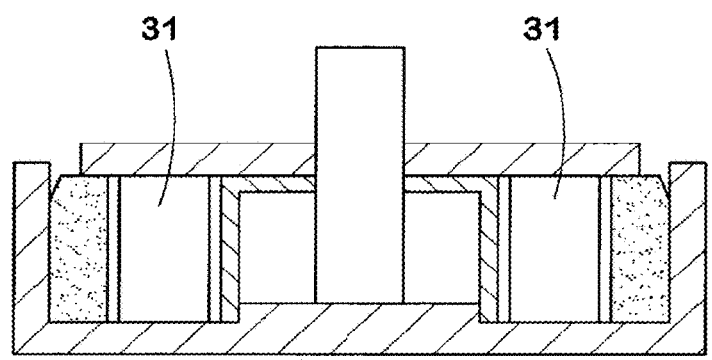

FIGS. 8 (A) and (B) are cross-section views showing a molding process in a method for manufacturing of the airless tire according to the second invention.

PREFERRED EMBODIMENT ACCORDING TO THE INVENTION

Hereinafter, embodiments of the present inventions will be described in detail.

Figure 1:
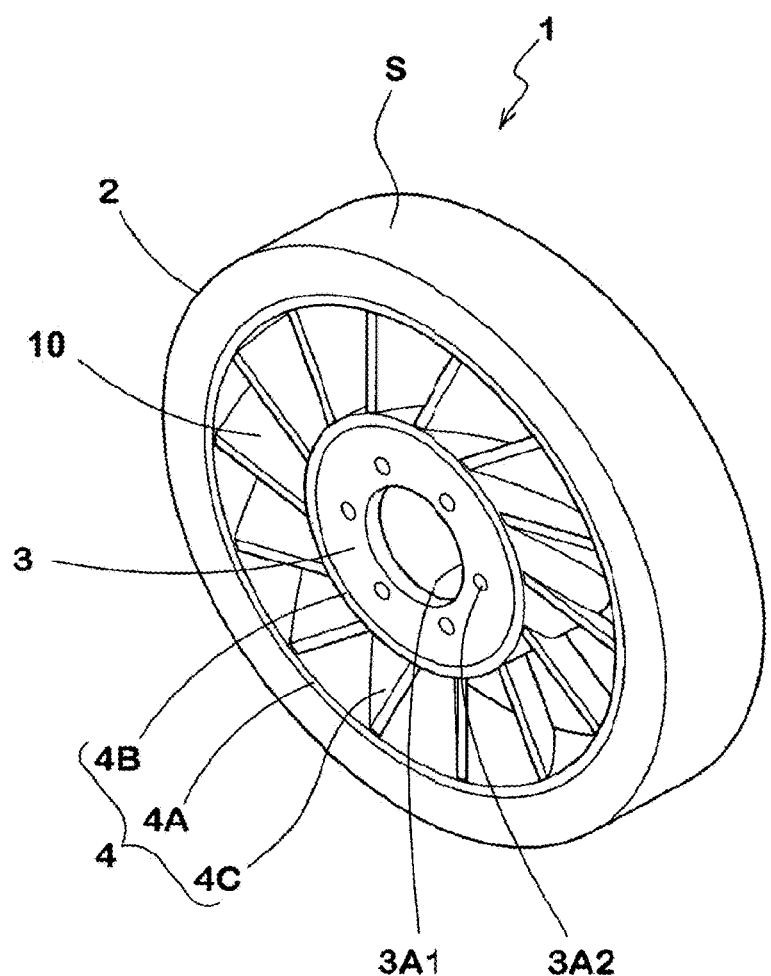
FIG. 1 is a perspective figure showing an embodiment of an airless tire according to the first invention.
Figure 2:
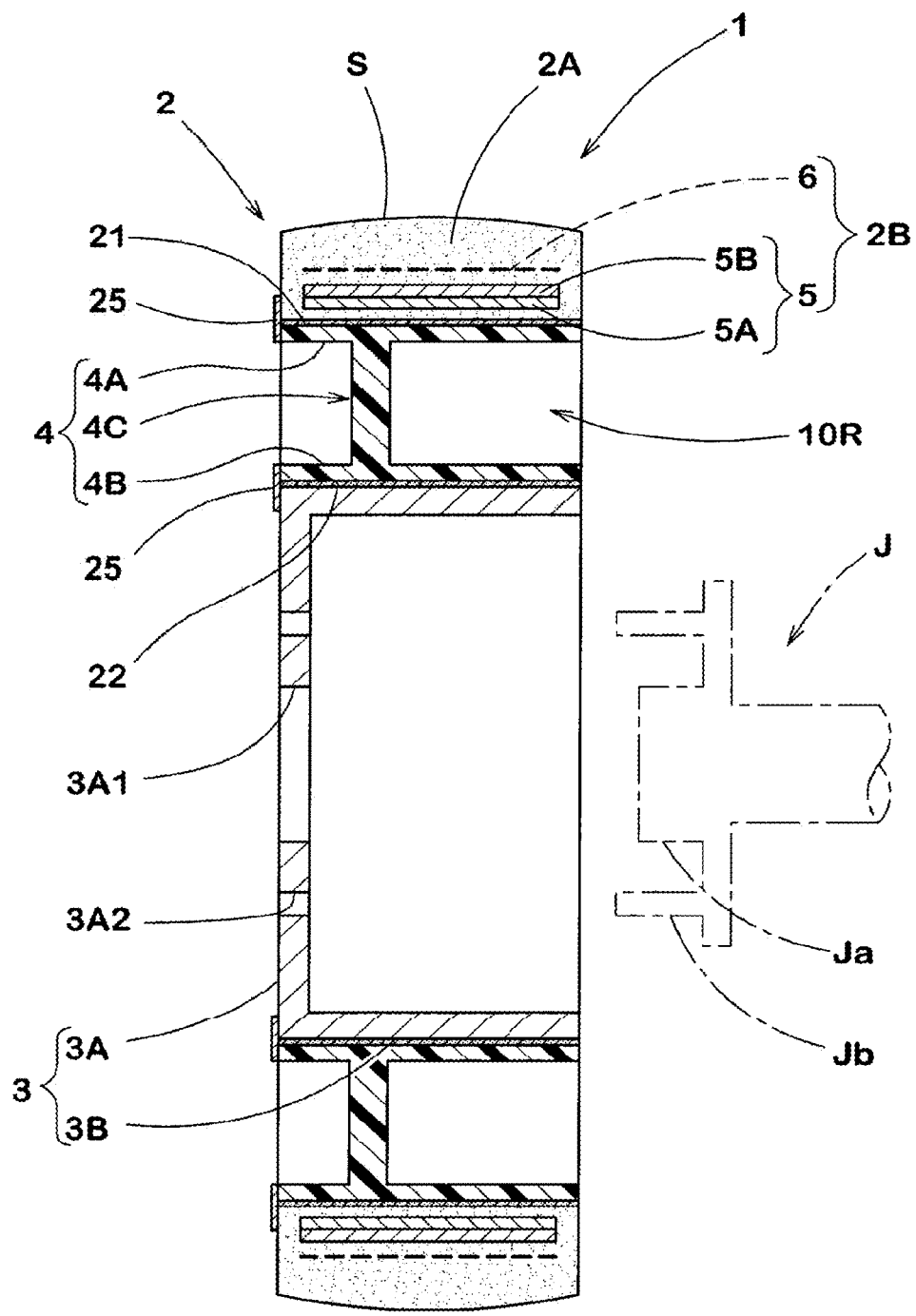
FIG. 2 is a meridional cross-section view.

As shown in FIGS. 1 and 2, an airless tire 1 according to the first invention comprises a cylindrical tread ring 2 having a contact area S, a hub 3 disposed on the radially inner side of the tread ring 2 and fixed to an axle 3, and a spoke 4 connecting the tread ring 2 with the hub 3. The present embodiment shows the case that the airless tire 1 is formed as a tire for a passenger vehicle.

The tread ring 2 is a portion corresponding to a tread portion of a pneumatic tire and comprises a tread rubber portion 2A and a reinforcing cord layer 2B buried therein.

For the tread rubber portion 2A, rubber composition excelling in a frictional force to connecting ground and a wear resistance is preferably employed. And on the contact area S forming an inner peripheral surface of the tread ring 2, tread grooves (not shown) are formed in various pattern shapes to give wet performance.

The reinforcing cord layer 2B of the present embodiment comprises a belt layer 5 and a band layer 6 superposed outside or inside in the radial direction of it. However, it is possible to form the reinforcing cord layer 2B of only the belt layer 5 or only the band layer 6. The belt layer 5 is formed of not less than one belt ply, two belt plies 5A, 5B in the present embodiment, having tire cords arranged at an angle of 10 to 45 degrees with respect to the circumferential direction of the tire. The tire cords of the plies intersect one another thereby improving rigidity of the tread ring 2. The band layer 6 is formed of at least one band ply, one band ply in the present embodiment, having a tire cord helically winding in the circumferential direction of the tire.

For the tire cord of the belt layer 5 and the tire cord of the band layer 6, a steel cord and an organic fiber cord can be employed, respectively. When using the organic fiber cord, high-modulus fiber such as aramid, polyethylene naphthalate (PEN), polyethylene terephthalate (PET) having a high intensity and a high elastic modulus are preferably employed.

Such a tread ring 2 is formed in a process for forming a raw tread ring and in a process for vulcanizing the raw tread ring in a vulcanization mold. In the forming process of the raw tread ring, sheet-like member for forming the belt layer 5, a sheet-like member for forming the band layer 6, and a sheet-like member for forming the tread rubber portion 2A are serially wound on the cylindrical drum in the circumferential direction so as to form the raw tread ring. Then, the raw tread ring is vulcanized in the vulcanization mold so as to form the above-mentioned tread ring 2.

The hub 3, which corresponds to a tire wheel in the present embodiment, comprises a disk-shaped disk portion 3A fixed to the axle J, and a cylindrical spoke attachment portion 3B integrally formed in the radially outer end portion of the disk portion 3A. In the center of the disk portion 3A, a hub hole 3A1 is formed. Into this hub hole 3A1, inserted is a front end portion Ja of the axle J. And the periphery of the hub hole 3A1 is provided with plurality of bolt insertion holes 3A2. In each of the bolt insertion holes 3A2, a bolt portion Jb disposed on the axle side is inserted and fixed with a nut. Such a hub 3 is preferably formed of metallic material such as steal, aluminum alloy, magnesium alloy and the like, for example, as is the case with a conventional tire wheel.

The spoke 4 is formed of cast molding body of high-polymer material. The spoke 4 integrally comprises an outer annular portion 4A, an inner annular portion 4B, and a spoke portion 4C. For the high-polymer material, thermoplastic resin and thermohardening resin can be employed. With the objective of safety, the resin such as epoxy-based resin, phenol-based resin, urethane-based resin, silicon-based resin, polyimide-based resin, melamine-based resin is preferably employed, for example. Especially, the urethane-based resin is preferably employed because of its excellent elastic property.

Figure 3:
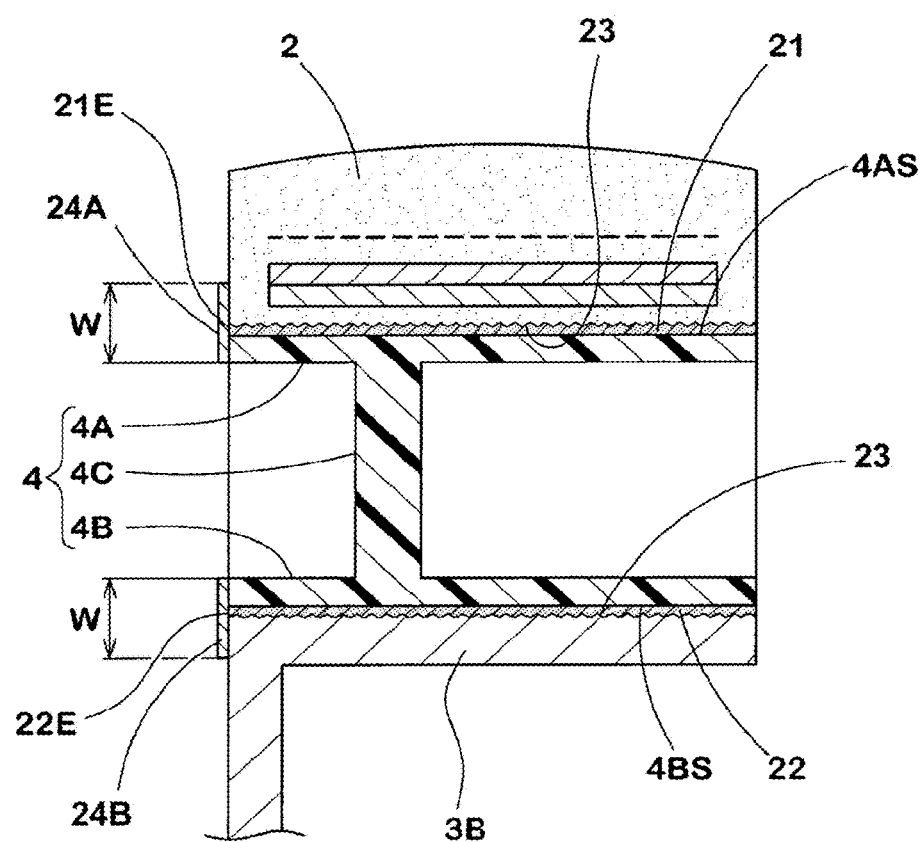
FIG. 3 is a cross-section view exaggeratingly showing a bonding portion between a tread ring, a spoke and a hub.
Figure 4A:
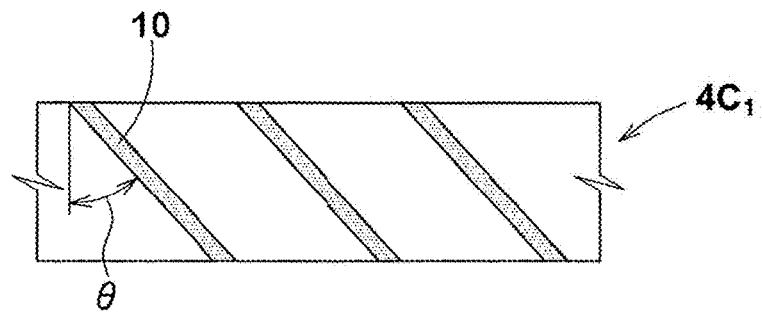
Figure 4B:
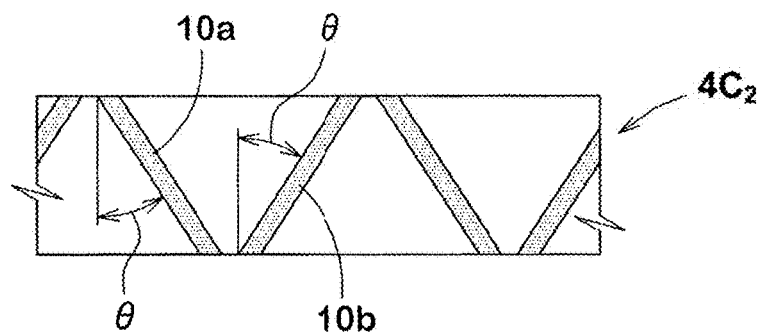
Figure 4C:
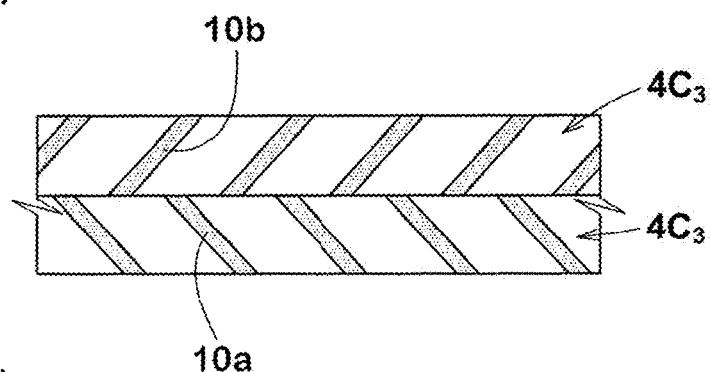
Figure 4D:
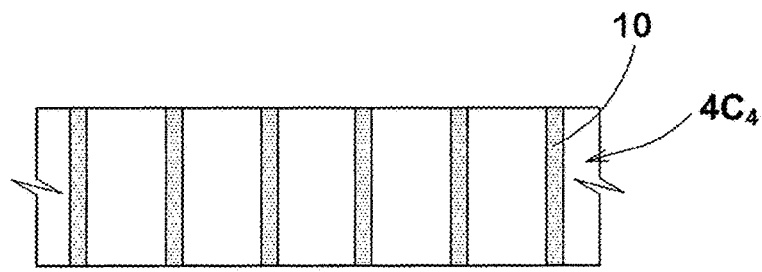
Figure 5A:
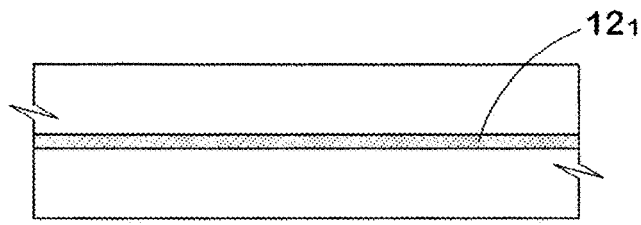
Figure 5B:
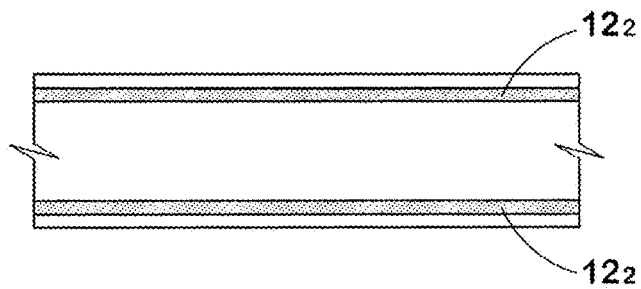
Figure 5C:
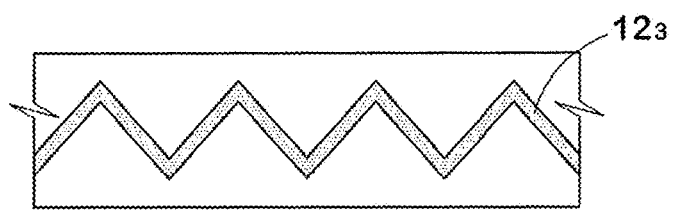
Figure 5D:
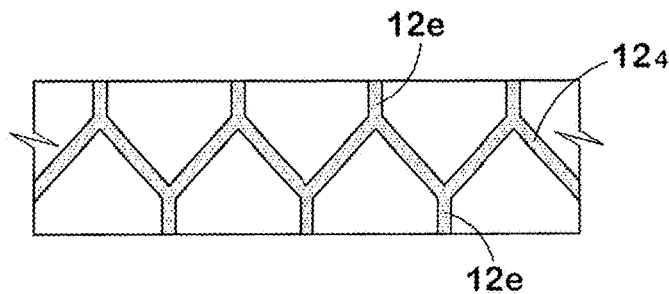

As shown in FIG. 3, the outer annular portion 4A is a cylindrical body which is concentric with the axle J. An outer peripheral surface 4As of the outer annular portion 4A is bonded to an inner peripheral surface 2S of the tread ring 2 via a first adhesion layer 21 made of first adhesive agent. The inner annular portion 4B is concentrically disposed in the radially inner side of the outer annular portion 4A. An inner peripheral surface 4BS of the inner annular portion 4B is bonded to an outer peripheral surface 3S of the hub 3 via a second adhesion layer 22 made of the adhesive agent. The spoke portion 4C integrally connects the outer annular portion 4A and the inner annular portion 4B.

As shown in FIG. 1, the spoke portion 4C of the present embodiment is formed of at least one spoke board row 10R extending circumferentially. This spoke board row 10R is formed by plurality of fin-like spoke boards 10 arranged in the circumferential direction and connecting between the outer annular portion 4A and the inner annular portion 4B.

Especially in the present embodiment, for the spoke board row 10R, as shown in FIG. 4 (A), the spoke boards 10 of the spoke portion $4C_1$ are inclined at an angle θ (theta) with respect to the tire axial direction and arranged in parallel to each other. However, for the spoke row 10R of the spoke portion $4C_2$, as shown in FIG. 4 (B), it is also possible to arrange alternately a first spoke board 10a inclined at the angle θ (theta) toward one side with respect to the tire axial direction and a second spoke board 10b inclined at the angle of θ (theta) toward the other side. Also shown in FIG. 4 (C), it is possible to form the spoke row 10R of the spoke portion $4C_3$ by two rows: a first spoke board row 10Ra made by arranging the first spoke boards 10a in parallel to each other, and a second spoke board row 10Rb made by arranging the second spoke boards 10b in parallel to each other. In this way, when the spoke board 10 is inclined at the angle θ (theta), the grounding time of the spoke board 10 gets longer; therefore a vibration performance of the tire can be improved. Meanwhile, the above-mentioned angle θ (theta) is preferably in a range of from 30 to 60 degrees although not particularly restricted. As shown in FIG. 4(D), it is also possible to form the spoke board row 10R of the spoke portion $4C_4$ by the spoke board 10 not inclined with respect to the tire axis direction (angle θ≈0).

As shown in FIGS. 5 (A) to (D), the spoke portion 4C can comprise a circumferential spoke board 12 extending continuously in the circumferential direction. In FIGS. 5 (A) and 5 (B), the circumferential spoke board $12_1$, $12_2$ circumferentially extends in a linear fashion. In FIGS. 5 (C) and 5 (D), the circumferential spoke board $12_3$, $12_4$ circumferentially extends in a zigzag manner. As shown in FIG. 5 (D) by deputy, when the spoke portion 4C comprises the circumferential spoke board $12_4$, it is possible to provide a side plate portion 12e extending outward in the axial direction of the tire from the spoke board $12_4$ to improve the rigidity. Specifically, when the circumferential spoke board $12_3$, $12_4$ is formed in the zigzag manner, the side plate portion 12e is preferably provided in a corner portion of the zigzag.

As shown in FIG. 3 exaggeratingly, the inner peripheral surface 2S of the tread ring 2, where the first adhesion layer 21 is arranged, and/or the outer peripheral surface 3S of the hub 3, where the second adhesion layer 22 is arranged, is formed of a roughened surface 23. In the present embodiment, both of the inner peripheral surface 2S of the tread ring 2 and the outer peripheral surface 3S of the hub 3 are formed as the roughened surface 23. However, it is also possible that only either of them is formed as the roughened surface 23. The roughened surface 23 has a surface roughness Ra (arithmetic roughness) ranging from 3 to 1000 μm or a surface roughness Rz (ten-point average roughness) ranging from 30 to 5000 μm.

In this way, since the inner peripheral surface 2S of the tread ring 2 and/or the outer peripheral surface 3S of the hub 3 is formed of the roughened surface 23, the contact area with the adhesive agent can be improved. Also the adhesive agent gets through and intertangles with the asperity of the roughened surface 23, thereby improving the bonding strength in cooperation with the increase of the contact area.

As a result, in cases where the inner peripheral surface 2S is the roughened surface 23, even if a hit of sand and stone and the like and a contact with a curbstone while running cause a damage in the outer end of the first adhesion layer 21, it is possible to inhibit the growth of the damage, and it is possible to reduce the flaking between the spoke 4 and the tread ring 2. In cases where the outer peripheral surface 3S is the roughened surface 23, even if damage generates in the outer end of the second adhesion layer 22, it is possible to inhibit the growth of the damage and to reduce the flaking between the spoke 4 and the hub 3.

Meanwhile, when the surface roughness Ra or Rz falls below the above-mentioned range, the enhancing effects of the bonding strength is insufficient, and the tire durability cannot be sufficiently improved. By contraries, the surface roughness Ra or Rz exceeds the above-mentioned range, when the inner peripheral surface 2S is the roughened surface 23, the salient of the roughened surface 23 as rubber runs into the outer peripheral surface of the outer annular portion 4A, and a strength of the outer peripheral surface of the outer annular portion 4A, thereby provoking possibly the deterioration of the tire durability. Also, when the outer peripheral surface 3S is the roughened surface 23, strength of the hub itself deteriorates, thereby provoking possibly the deterioration of the strength of the hub itself during use. It is more preferably that the roughened surface 23 has both of the surface roughness Ra (arithmetic roughness) and the surface roughness Rz (ten-point average roughness) meeting the respective ranges.

Also, to inhibit more the deterioration of the durability arisen from the hit of sand and stone and the like and the contact with the curbstone while running, the airless tire 1 of the present embodiment is provided with a first covering member 24A and/or a second covering member 24B. The first covering member 24A covers and protects an outer end portion 21E in the vehicle mounting direction of the first adhesion layer 21. Also, the second covering member 24B covers and protects an outer end portion 22E in the vehicle mounting direction of the second adhesion layer 22. The present embodiment shows the case that both of the first covering member 24A and the second covering member 24B are disposed. However, there may be either of them. Meanwhile, the outer side in the vehicle mounting direction means the outward direction of the vehicle in the tire axial direction when the tire is mounted on the vehicle.

The first and second covering members 24A, 24B can reduce the generation of damage itself in the outer end portions 21E, 22E. Even if the damage generates, it is possible to reduce the growth of the damage owing to the sand, stone and the like getting through inside, thereby improving the durability. Here, the reason for covering the outer side in the vehicle mounting direction is that the hit of sand and stone and the like and the contact with the curbstone while running generates mainly on the outer side of the vehicle mounting direction.

As shown in FIG. 3, this embodiment shows the case that the first and second covering members 24A, 24B are tapes 25 applied on the outer side surface in the vehicle mounting direction of the airless tire 1. The tapes 25 cover and protect the outer end portions 21E, 22E, respectively. The tape 25 is not specifically restricted but commercially available various adhesion tapes where an adhesive agent is applied on one side of a film is preferably employed. For the film, for example, a film of synthetic resin such as polypropylene, polyester, polyethylene, vinyl chloride, nylon and the like are preferably employed in terms of the water resistance, durability and the like. However, for the film, cloth and sheet metal can be also employed upon request.

The first and second covering members 24A, 24B may be a film of paint (not shown) applied on the outer surface in the vehicle mounting direction of the airless tire 1. For the film of paint, commercially available various coating materials are preferably employed. The film of paint is not necessary to be formed full part of the outer surface of the airless tire 1, but the width W may be not more than 10 mm, or not more than 5 mm for example, as long as it covers the outer end portions 21E, 22E as is the case with the above-mentioned tape 25. The film of paint and the tape 25 have preferably a thickness of not more than 1.0 mm. When it exceeds 1.0 mm, a heat storage performance is improved, thereby provoking temperature increase while running and negatively affect to the durability of the spoke 4.

As shown in FIG. 6 (A), the first covering member 24A may be a tread protruding portion 26 protruding in the tread ring $2_1$. In particular, this tread protruding portion 26 protrudes radially inwardly at a level of the outer end of the inner peripheral surface 2S. And the tread protruding portion 26 has a projecting height from the inner peripheral surface 2S larger than the thickness of a first adhesion layer 21 thereby enabling to cover the outer end portion 21E of the first adhesion layer 21.

As shown in FIG. 6 (B), the first covering member 24A may be a spoke protruding portion 27 protruding in the outer annular portion 4A of the spoke $4_2$. Concretely, this spoke protruding portion 27 radially outwardly protrudes at the level of the outer end of the outer peripheral surface of the outer annular portion 4A. And the spoke protruding portion 27 has a projecting height from the outer peripheral surface larger than the thickness of the first adhesion layer 21 thereby enabling to cover the outer end portion 21E of the first adhesion layer 21. In the present embodiment, the tread protruding portion 26 and the spoke protruding portion 27 are formed on the inner side and outer side in the vehicle mounting direction, respectively, but it is also acceptable to prove only on the outside in the vehicle mounting direction.

As shown in FIG. 7 (A), the second covering member 24B may be also a hub protruding portion 28 protruding in the hub $3_1$. Concretely, this hub protruding portion 28 protrudes radially outwardly protrudes at the level of the outer end of the outer peripheral surface 3S. The 16 hub protruding portion 28 has a projecting height from the outer peripheral surface 3S larger than the thickness of the second adhesion layer 22 thereby enabling to cover the outer end portion 22E of the second adhesion layer 22.

As shown in FIG. 7 (B), the second covering member 24B may be a spoke protruding portion 29 protruding in the inner annular portion 4B of the spoke $4_1$. Concretely, this spoke protruding portion 29 radially inwardly protrudes at the level of the outer end of the inner peripheral surface of the inner annular portion 4B. And the spoke protruding portion 29 has a projecting height from the inner peripheral surface larger than the thickness of the second adhesion layer 22 thereby enabling to cover the outer end portion 22E of the second adhesion layer 22. In this embodiment, the hub protruding portion 28 and the spoke protruding portion 29 are formed on the inner side and outer side in the vehicle mounting direction, respectively, but it is also acceptable to prove only on the outside in the vehicle mounting direction.

FIGS. 6 (A) and (B) show the case of forming only the first covering member 24A; FIGS. 7 (A) and (B) show the case of forming only the second covering member 24B. However, as is the case with FIG. 3, it is also possible to form both the first covering member 24A and the second covering member 24B.

Next, a method for manufacturing (according to the second invention) of the airless tire 1 will be described. This method for manufacturing comprises a surface roughening process, a first coating process, a second coating process, and a molding process.

The surface roughening process comprises at least one of a surface roughening process to the tread ring 2 and a surface roughening process to the hub 3. In the surface roughening process to the tread ring 2, a surface roughening is executed on the inner peripheral surface 2S of the tread ring 2 after vulcanization molding. As a result, the inner peripheral surface 2S is processed into the roughened surface 23 having the surface roughness Ra (arithmetic roughness) ranging from 3 to 1000 μm or the surface roughness Rz (ten-point average roughness) ranging from 30 to 5000 μm. Also in the surface roughening process to the hub 3, the outer peripheral surface 3S of the hub 3 is executed a surface roughening. As a result, the outer peripheral surface 3S is proceeded into the roughened surface 23 having the surface roughness Ra (arithmetic roughness) ranging from 3 to 1000 μm or the surface roughness Rz (ten-point average roughness) ranging from 30 to 5000 μm.

In the surface roughening, spraying and running particles such as metal, plastic, sand and the like onto a surface to be processed at high velocities, as it is called a blast process, is preferably employed. In this case, by making an adjustment of a particle diameter of the particle and a processing time, the above-mentioned range can be obtained.

In the first coating process, applying the adhesive agent on the inner peripheral surface 2S of the tread ring 2 forms the first adhesion layer 21. When the surface roughening process to tread ring 2 is executed, the first adhesion layer 21 is formed on the inner peripheral surface 2S of the roughened surface 23.

In the second coating process, applying the adhesive agent on the outer peripheral surface 3S of the hub 3 forms the second adhesion layer 22. When the surface roughening process to the hub 3 is executed, the second adhesion layer 22 is formed on the outer peripheral surface 3S of the roughened surface 23.

For the adhesive agent forming the first and second adhesion layers 21, 22, various kinds of adhesive agents such as latex type, solvent type, respondence type and the like can be appropriately chosen depending on quality of material of an adherend. In the present embodiment, the first adhesion layer 21 and the second adhesion layer 22 are formed of the same adhesive agent, but also possibly formed of different adhesive agents, respectively.

As shown in FIGS. 8 (A), (B), in the molding process, the tread ring 2 provided in the inner peripheral surface 2S with the first adhesion layer 21 and the hub 3 provided on the outer peripheral surface 3S with the second adhesion layer 22 are set in a casting mold 30. As a result, a space 31 corresponding to the spoke 4 is formed inside this casting mold 30 and between the tread ring 2 and the hub 3. And, by filling the raw material fluid of the high-polymer material into the space 31, the spoke 4 is integrally molded with the tread ring 2 and the hub 3. Meanwhile, the filling of the raw material fluid is performed before curing of the adhesive agent.

In this case, when the raw material fluid cures, the first adhesion layer 21 and the spoke 4, and the second adhesion layer 22 and the spoke 4 react on each interfacial surface, thereby a strong bonding force is exerted. For example, when the urethane-based resin is used as the raw material fluid, it is preferable to use an adhesive agent such as an adhesive agent used to bond castable and millable urethane CHEMLOK 218E (trademark) manufactured by LORD FAR EAT INC., which adheres the urethane-based resin and a hard adhered made of metal and others. In this case, chemical compound in the raw material fluid and chemical compound in the adhesive agent develop a cross-linking reaction and the like on the interfacial surface and join together, thereby a strong bonding force is executed. Therefore, the bonding strength is kept at a sufficiently high level between the first and second adhesion layers 21, 22 and the spoke 4. However, a bonding strength between the first adhesion layer 21 and the tread ring 2 and/or a bonding strength between the second adhesion layer 22 and the hub 3 is improved when the inner peripheral surface 2S of the ring 2 and/or the outer peripheral surface 3S of the hub 3 is the roughened surface 23.

The preferred embodiments of the present inventions are especially discussed in detail, the present inventions are not limited to the illustrated embodiment, and various modifications can be modified.

Examples

Based on the method for manufacturing according to the second invention, a test tire passenger vehicle (corresponding to a tire size: 145/70R12) having an internal structure shown in FIG. 1 was made in the specification shown in Tables 1 and 2. And after a molding process, a visual inspection was executed with regard to an adhesion condition of the spoke at the time of demolding the tire from the casting mold (adhesion condition in demolding). And regarding each of the test tires, executed were a drum running test and an actual vehicle running test. In Table 1, the bonding strength of the bonding portion between the spoke and the tread ring was evaluated. In Table 2, the bonding strength of the bonding portion between the spoke and the hub was evaluated.

In each of the test tires, urethane-based resin was employed for the spoke, and the adhesive agent such as CHEMLOK 218E (trademark) manufactured by LORD FAR EAST INC. was employed for a first adhesion layer and a second adhesion layer. And in Table 1, a surface roughness of a hub outer peripheral surface of each tire was the same (Ra=6.77 μm; Rz=92.99 μm), and only a surface roughness of a tread ring inner peripheral surface and a first covering member was changed. In Table 2, a surface roughness of a tread ring inner peripheral surface of each tire was the same (Ra=6.77 μm; Rz=92.99 μm), and only the surface roughness of the hub outer peripheral surface and the second covering member was changed.

(1) Drum Running Test:

with use of a drum testing machine, a test tire ran 10000 km on a drum under a load of 3 kN and at a speed of 100 km/h. In Table 1, the adhesion condition in the bonding portion between the spoke and the tread ring after running was inspected visually. In Table 2, the adhesion condition in the bonding portion between the spoke and the hub after running was inspected visually.

(2) Actual Vehicle Running Test:

The test tires were mounted on four wheels of a compact electric vehicle for one-seater CMOS (trademark) manufactured by TOYOTA AUTO BODY Co., Ltd. and ran 10000 km on a road in an urban area. In Table 1, a damage state in the bonding portion between the spoke and the tread ring after running was inspected visually. In Table 2, a damage state in the bonding portion between the spoke and the hub after running was inspected visually.

TABLE 1

|  | Ex. A1 | Ex. A2 | Ex. A3 | Com. Ex A1 | Com. Ex A2 | Com. Ex A3 | Ex. A4 | Ex. A5 | Ex. A6 | Ex. A7 |
|---|---|---|---|---|---|---|---|---|---|---|
| Spoke | | | | | | | | | | |
| Outer annular portion | | present | | absent | | | | present | | |
| Inner annular portion | | present | | absent | | | | present | | |
| Spoke portion | | | | | present | | | | | |
| First adhesion layer | | | | | present | | | | | |
| Surface roughness of tread ring inner peripheral surface | | | | | | | | | | |
| Ra (μm) | 6.77 | 6.77 | 6.77 | 6.77 | 2.82 | 1500 | 3 | 1000 | — | — |
| Rz (μm) | 92.99 | 92.99 | 92.99 | 92.99 | 26.45 | — | — | — | 30 | 5000 |
| First covering member | absent | present | present | — | — | — | absent | — | — | — |
| Tape (thickness) | — | — | — | — | — | — | — | — | — | — |
| Tread ring protruding portion | — | present | — | — | — | — | — | — | — | — |
| Spoke protruding portion | — | — | present | — | — | — | — | — | — | — |
| Adhesion condition in demolding | good | good | good | misalignment of spoke portion | misalignment of spoke portion | good | good | good | good | good |
| Drum running test | good | good | good | difficult to conduct | difficult to conduct | *2 | good | good | good | good |
| Actual vehicle running test | *1 | good | good | difficult to conduct | difficult to conduct | *3 | *1 | *1 | *1 | *1 |

|  | Ex. A8 | Ex. A9 | Ex. A10 | Ex. A11 |
|---|---|---|---|---|
| Spoke | | | | |
| Outer annular portion | | | | present |
| Inner annular portion | | | | present |
| Spoke portion | | | | present |
| First adhesion layer | | | | present |
| Surface roughness of tread ring inner peripheral surface | | | | |
| Ra (μm) | | | | 6.77 |
| Rz (μm) | | | | 92.99 |
| First covering member | | | | present |

TABLE 1-continued

|  |  |  |  |  |
|---|---|---|---|---|
| Tape (thickness) | nylon (0.5 mm) | nylon (0.5 mm) | nylon (0.5 mm) | nylon (2.0 mm) |
| Tread ring protruding portion | present | — | — | — |
| Spoke protruding portion | — | — | present | — |
| Adhesion condition in demolding | good | good | good | good |
| Drum running test | good | good | good | good |
| Actual vehicle running test | good | good | good | good |

*1 A damage arises in a bonding portion of a tread ring but does not grow; there is no problem in use.
*2 A surface roughness is too rough; strength of bonding itself deteriorates, and durability runs short.
*3 A damage arises, and the damage growths in a bonding portion of a tread ring.

As shown in Table 1, even if a damage arose in the outer end of the adhesion layer by hit of a stone and the like while running, it was confirmed that Examples A1 to A11 could inhibit growth of the damage and reduce flaking between the spoke and the tread ring, thereby improving a durability of the tire. Specifically, when the tire comprised of the first covering member, it was confirmed that the generation of the damage itself in the adhesion layer outer end could be reduced. Also, in Example A11, since the tape was thick, it was good in an ordinary use but carried a concern about a deterioration of strength of the spoke in long running or high-speed running owing to temperature elevation.

TABLE 2

|  | Ex. B1 | Ex. B2 | Ex. B3 | Com. Ex. B1 | Com. Ex. B2 | Com. Ex. B3 | Ex. B4 | Ex. B5 | Ex. B6 | Ex. B7 |
|---|---|---|---|---|---|---|---|---|---|---|
| Spoke |  |  |  |  |  |  |  |  |  |  |
| Outer annular portion | — | present | — | absent | — | — | — | present | — | — |
| Inner annular portion | — | present | — | absent | — | — | — | present | — | — |
| Spoke portion | — | — | — | — | present | — | — | — | — | — |
| Second adhesion layer | — | — | — | — | present | — | — | — | — | — |
| Surface roughness of hub outer peripheral surface |  |  |  |  |  |  |  |  |  |  |
| Ra (μm) | 6.77 | 6.77 | 6.77 | 6.77 | 2.82 | 1500 | 3 | 1000 | — | — |
| Rz (μm) | 92.99 | 92.99 | 92.99 | 92.99 | 26.45 | — | — | — | 30 | 5000 |
| Second covering member | absent | present | present | — | — | absent | — | — | — | — |
| Tape (thickness) | — | — | — | — | — | — | — | — | — | — |
| Hub protruding portion | — | present | — | — | — | — | — | — | — | — |
| Spoke protruding portion | — | — | present | — | — | — | — | — | — | — |
| Adhesion condition in demolding | good | good | good | misalignment of spoke portion | misalignment of spoke portion | good | good | good | good | good |
| Drum running test | good | good | good | difficult to conduct | difficult to conduct | *2 | good | good | good | good |
| Actual vehicle running test | *1 | good | good | difficult to conduct | difficult to conduct | *3 | *1 | *1 | *1 | *1 |

|  | Ex. B8 | Ex. B9 | Ex. B10 | Ex. B11 |
|---|---|---|---|---|
| Spoke |  |  |  |  |
| Outer annular portion | — | — | present | — |
| Inner annular portion | — | — | present | — |
| Spoke portion | — | — | present | — |
| Second adhesion layer | — | — | present | — |
| Surface roughness of hub outer peripheral surface |  |  |  |  |
| Ra (μm) | — | — | 6.77 | — |
| Rz (μm) | — | — | 92.99 | — |
| Second covering member | — | — | present | — |
| Tape (thickness) | nylon (0.5 mm) | nylon (0.5 mm) | nylon (0.5 mm) | nylon (2.0 mm) |
| Hub protruding portion | present | — | — | — |
| Spoke protruding portion | — | — | present | — |
| Adhesion condition in demolding | good | good | good | good |
| Drum running test | good | good | good | good |
| Actual vehicle running test | good | good | good | good |

*1 A damage arises in a bonding portion of a hub but does not grow; there is no problem in use.
*2 A surface roughness is too rough; strength of hub itself deteriorates, and durability runs short.
*3 A damage arises, and the damage growths in a bonding portion of a hub.

As shown in Table 2, even if a damage arose in the outer end of the adhesion layer by hit of a stone and the like while running, it was confirmed that Examples B1 to B11 could inhibit growth of the damage and reduce flaking between the spoke and the hub, thereby improving a durability of the tire. Specifically, when the tire comprised of the second covering member, it was confirmed that the generation of the damage itself in the adhesion layer outer end could be reduced. Also, in Example B11, since the tape was thick, it was good in an ordinary use but carried a concern about a deterioration of strength of the spoke in long running or high-speed running owing to temperature elevation.

DESCRIPTION OF THE SYMBOL

1 Airless tire
2 Tread ring
3 Hub
4 Spoke
4A Outer annular portion
4B Inner annular portion
4C Spoke portion
21 First adhesion layer
22 Second adhesion layer
23 Roughened surface
24A First covering member
24B Second covering member
25 Tape
26 Tread ring protruding portion
27 Spoke protruding portion
28 Hub protruding portion
29 Spoke protruding portion
30 Casting mold
31 Space
J Axle
S Contact area

The invention claimed is:

1. An airless tire, comprising:
a tread ring having a cylindrical form and a contact area;
a hub positioned inwardly in a radial direction of the tread ring and configured to be fixed to an axle;
a spoke connecting the tread ring and the hub and comprising a cast molding body integrally having an outer annular portion, an inner annular portion and a spoke portion connecting the outer annular portion and the inner annular portion;
a first adhesion layer made of a first adhesive agent and bonding the outer annular portion of the cast molding body and an inner peripheral surface of the tread ring;
a second adhesion layer made of a second adhesive agent and bonding the inner annular portion of the cast molding body and an outer peripheral surface of the hub; and
a covering member covering at least one outer end face of the second adhesion layer in a tire axial direction,
wherein the cast molding body of the spoke is made of a polymer material comprising one of a thermoplastic resin and a thermohardening resin, and the outer peripheral surface of the hub has a roughened surface, and the covering member is an inner spoke protruding portion formed integrally with the inner annular portion of the spoke and protruding from the inner annular portion of the spoke such that the inner spoke protruding portion is in contact with an outer side surface of the hub in the tire axial direction.

2. The airless tire of claim 1, wherein the outer peripheral surface of the hub has the roughened surface having a surface roughness Ra in arithmetic roughness in a range of 3 to 1000 μm or a surface roughness Rz in ten-point average roughness in a range of 30 to 5000 μm.

3. A method for manufacturing an airless tire, comprising:
roughening an inner peripheral surface of a tread ring and/or an outer peripheral surface of a hub such that the inner peripheral surface and/or the outer peripheral surface has a roughened surface;
applying a first adhesive agent on the inner peripheral surface of the tread ring such that a first adhesion layer comprising the first adhesive agent is formed on the inner peripheral surface of the tread ring;
applying a second adhesive agent on the outer peripheral surface of the hub such that a second adhesion layer comprising the second adhesive agent is formed on the outer peripheral surface of the hub;
placing the tread ring with the first adhesion layer and the hub with the second adhesion layer in a casting mold such that a space configured to form a spoke is formed between the tread ring and the hub in the casting mold; and
filling raw material fluid of a polymer material into the space before curing of the first and second adhesive agents such that the spoke bonding with the tread ring and the hub is formed,
wherein the tread ring has a cylindrical form and a contact area, the hub is positioned inwardly in a radial direction of the tread ring and configured to be fixed to an axle, the spoke is connecting the tread ring and the hub and comprises a cast molding body integrally having an outer annular portion, an inner annular portion and a spoke portion connecting the outer annular portion and the inner annular portion, the first adhesion layer is made of the first adhesive agent and bonding the outer annular portion of the cast molding body and the inner peripheral surface of the tread ring, the second adhesion layer is made of the second adhesive agent and bonding the inner annular portion of the cast molding body and the outer peripheral surface of the hub, the spoke has a covering member covering at least one outer end face of the second adhesion layer in a tire axial direction, the covering member is an inner spoke protruding portion formed integrally with the inner annular portion of the spoke and protruding from the inner annular portion of the spoke such that the inner spoke protruding portion is in contact with an outer side surface of the hub in the tire axial direction, and the cast molding body of the spoke is made of the polymer material comprising one of a thermoplastic resin and a thermohardening resin.

4. The method of claim 3, wherein the roughening of the inner peripheral surface of the tread ring and/or the outer peripheral surface of the hub comprises forming the roughened surface having a surface roughness Ra in arithmetic roughness in a range of 3 to 1000 μm or the surface roughness Rz in ten-point average roughness in a range of 30 to 5000 μm.

5. The airless tire of claim 1, further comprising:
an additional covering member covering at least one outer end face of the first adhesion layer in a tire axial direction,
wherein the inner peripheral surface of the tread ring has a roughened surface.

6. The airless tire of claim 5, wherein the inner peripheral surface of the tread ring has the roughened surface having a surface roughness Ra in arithmetic roughness in a range of 3 to 1000 μm or a surface roughness Rz in ten-point average roughness in a range of 30 to 5000 μm.

7. The airless tire of claim 5, wherein the additional covering member is a tape adhered to an outer side surface of the airless tire in the tire axial direction.

8. The airless tire of claim 5, wherein the additional covering member is a covering layer of paint applied on an outer side surface of the airless tire in the tire axial direction.

9. The airless tire of claim 5, wherein the additional covering member is a tread protruding portion formed integrally with the tread ring and protruding from the tread ring such that the tread protruding portion is in contact with an entire outer side surface of the outer annular portion of the spoke in the tire axial direction.

10. The airless tire of claim 5, wherein the additional covering member is an outer spoke protruding portion formed integrally with the outer annular portion of the spoke and protruding from the outer annular portion of the spoke such that the outer spoke protruding portion is in contact with an outer side surface of the tread ring in the tire axial direction.

11. The airless tire of claim 6, wherein the additional covering member is a tape adhered to an outer side surface of the airless tire in the tire axial direction.

12. The airless tire of claim 6, wherein the additional covering member is a covering layer of paint applied on an outer side surface of the airless tire in the tire axial direction.

13. The airless tire of claim 2, further comprising:
a additional covering member covering at least one outer end face of the first adhesion layer in a tire axial direction,
wherein the inner peripheral surface of the tread ring has a roughened surface.

14. The airless tire of claim 13, wherein the inner peripheral surface of the tread ring has the roughened surface having a surface roughness Ra in arithmetic roughness in a range of 3 to 1000 μm or a surface roughness Rz in ten-point average roughness in a range of 30 to 5000 μm.

15. The airless tire of claim 13, wherein the additional covering member is a tape adhered to an outer side surface of the airless tire in the tire axial direction.

16. The airless tire of claim 13, wherein the additional covering member is a covering layer of paint applied on an outer side surface of the airless tire in the tire axial direction.

17. The airless tire of claim 13, wherein the additional covering member is a tread protruding portion formed integrally with the tread ring and protruding from the tread ring such that the tread protruding portion is in contact with an entire outer side surface of the outer annular portion of the spoke in the tire axial direction.

18. The airless tire of claim 13, wherein the additional covering member is an outer spoke protruding portion formed integrally with the outer annular portion of the spoke and protruding from the outer annular portion of the spoke such that the outer spoke protruding portion is in contact with an outer side surface of the tread ring in the tire axial direction.

19. The airless tire of claim 14, wherein the additional covering member is a tape adhered to an outer side surface of the airless tire in the tire axial direction.

20. The airless tire of claim 14, wherein the additional covering member is a covering layer of paint applied on an outer side surface of the airless tire in the tire axial direction.

* * * * *